(12) United States Patent
Bowman et al.

(10) Patent No.: US 10,752,806 B2
(45) Date of Patent: Aug. 25, 2020

(54) ELASTIC GAS BARRIER COATING COMPOSITIONS

(71) Applicant: PPG Industries Ohio, Inc., Cleveland, OH (US)

(72) Inventors: Mark P. Bowman, New Kensington, PA (US); Mark Keitzer, Ellwood City, PA (US); Edward F. Rakiewicz, Gibsonia, PA (US); Roxalana L. Martin, Pittsburgh, PA (US); Dennis Leroy Faler, North Huntingdon, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 741 days.

(21) Appl. No.: 14/689,071

(22) Filed: Apr. 17, 2015

(65) Prior Publication Data
US 2015/0368512 A1 Dec. 24, 2015

Related U.S. Application Data

(60) Provisional application No. 62/013,675, filed on Jun. 18, 2014.

(51) Int. Cl.
*C09D 181/04* (2006.01)
*C09D 175/04* (2006.01)
(Continued)

(52) U.S. Cl.
CPC ........... *C09D 181/04* (2013.01); *C08G 18/10* (2013.01); *C08L 29/04* (2013.01); *C08L 75/04* (2013.01);
(Continued)

(58) Field of Classification Search
None
See application file for complete search history.

(56) References Cited

U.S. PATENT DOCUMENTS 2,787,608 A 4/1957 Gregory et al.
2,929,794 A 3/1960 Simon et al.
(Continued)

FOREIGN PATENT DOCUMENTS

EP 2502742 A2 9/2012
JP 6377740 A 4/1988
(Continued)

OTHER PUBLICATIONS

Emulsion Definition, Merriam-Webster dictionary, accessed at https://www.merriam-webster.com/dictionary/ennulsion (2019). (Year: 2019).*

(Continued)

*Primary Examiner* — Scott R. Walshon
*Assistant Examiner* — Elaine M Vazquez
(74) *Attorney, Agent, or Firm* — Michael J. Grese (57) ABSTRACT

An elastic gas barrier coating composition includes a barrier material dispersed in an aqueous media, a polysulfide, and a curing agent reactive with the polysulfide. When applied to a substrate and cured to form a coating, the barrier material forms a continuous phase and a polysulfide elastomer forms a discontinuous phase. An elastic gas coating is also disclosed that includes a continuous phase with a barrier material and a discontinuous phase with a polysulfide elastomer. Substrates at least partially coated with elastic gas barrier coating compositions are further disclosed.

21 Claims, 2 Drawing Sheets

(51) Int. Cl.

| | | |
|---|---|---|
| *C09D 181/00* | (2006.01) | |
| *C08L 81/04* | (2006.01) | |
| *C08L 75/04* | (2006.01) | |
| *C09J 175/04* | (2006.01) | |
| *C08L 29/04* | (2006.01) | |
| *C09D 175/00* | (2006.01) | |
| *C08L 77/06* | (2006.01) | |
| *C08G 18/10* | (2006.01) | |
| *C08L 75/08* | (2006.01) | |

(52) U.S. Cl.
CPC .............. *C08L 75/08* (2013.01); *C08L 77/06* (2013.01); *C08L 81/04* (2013.01); *C09D 175/00* (2013.01); *C09D 175/04* (2013.01); *C09D 181/00* (2013.01); *C09J 175/04* (2013.01); *Y10T 428/31533* (2015.04)

(56) References Cited

U.S. PATENT DOCUMENTS

| | | | |
|---|---|---|---|
| 2,940,959 A | 6/1960 | Rosenthal et al. | |
| 3,077,464 A | 2/1963 | Simon et al. | |
| 3,118,856 A | 1/1964 | Salyer et al. | |
| 3,299,934 A | 1/1967 | Pace | |
| 3,951,898 A | 4/1976 | Paul, III | |
| 4,166,874 A | 9/1979 | McCready | |
| 4,239,799 A | 12/1980 | Weinberg et al. | |
| 4,607,078 A | 8/1986 | Dergazarian | |
| 4,928,741 A | 5/1990 | Rye et al. | |
| 5,244,429 A | 9/1993 | Sinclair | |
| 5,292,590 A | 3/1994 | Lin et al. | |
| 5,789,083 A | 8/1998 | Thomas | |
| 6,062,283 A | 5/2000 | Watanabe et al. | |
| 6,106,950 A | 8/2000 | Searle et al. | |
| 6,232,389 B1 * | 5/2001 | Feeney ................ B60C 1/00 427/245 | |
| 6,397,912 B1 | 6/2002 | Watanabe et al. | |
| 6,494,543 B1 | 12/2002 | Hashimura et al. | |
| 6,932,720 B2 | 8/2005 | Hogge et al. | |
| 8,716,402 B2 | 5/2014 | Temple et al. | |
| 2003/0069085 A1 | 4/2003 | Hogge et al. | |
| 2003/0191233 A1 * | 10/2003 | Lin ................ C08L 23/22 524/588 | |
| 2004/0147344 A1 | 7/2004 | Sullivan | |
| 2009/0220700 A1 | 9/2009 | Peres | |
| 2010/0003525 A1 | 7/2010 | Cosman | |
| 2011/0146869 A1 | 6/2011 | Majumdar | |
| 2012/0279626 A1 | 11/2012 | Incavo | |
| 2014/0238570 A1 | 8/2014 | Shimizu et al. | |

FOREIGN PATENT DOCUMENTS

| | | | |
|---|---|---|---|
| JP | 2003206401 A | 7/2003 | |
| JP | 2008111083 A | 5/2008 | |
| RU | 2141986 C1 | 11/1999 | |
| RU | 2326913 | 1/2009 | |
| WO | 2002096677 A1 | 12/2002 | |
| WO | 2005093000 A1 | 10/2005 | |
| WO | 2006029145 A2 | 3/2006 | |
| WO | 2006032034 A2 | 3/2006 | |
| WO | 2007111584 A1 | 10/2007 | |
| WO | 2007143334 A1 | 12/2007 | |
| WO | 2009095739 A1 | 8/2009 | |
| WO | WO-2009095739 A1 * | 8/2009 | ............ C08G 18/10 |
| WO | 2012057051 A1 | 5/2012 | |

OTHER PUBLICATIONS

Beall et al., "Fundamentals of Polymer-Clay Nanocomposites,", Cambridge Press, 2011, p. 36.

Chang et al., Gas Permeability, Water Absorption, Hydrolytic Stability and Air-Oven Aging of Polysobutylene-Based Polyurethane Networks, Polymer Bulletin 8, 1982, pp. 69-74.

Dow Corning Corporation, Insulating Glass Technical Manual, Jun. 2013, Dow Corning Construction Solutions, USA.

George et al., "Transport Phenomena Through Polymeric Systems," Progress in Polymer Science, 2001, vol. 26, pp. 985-1017.

Guchhait et al., "Preparation and Characterization of Polyurethane /Polysulfide Miscible Blend Nanocomposites," International Polymer Processing Journal—Aug. 2012 vol. 2, Issue 4, pp. 461-468.

Lai et al., "TPX/Siloxane Blend Membrane for Oxygen Enrichment," J. Applied Polymer Science 1987:34; 559.

Maas et al., Laboratory Assessment of Cementitious Coatings as a Barrier to Radon Gas Entry, International Radon Symposium, 1997, III-1.1-III-1.13, Radon Reduction Technology Laboratory, Mechanical Engineering Department; University of Wisconsin-Milwaukee, Milwaukee, WI, USA.

Mazurek et al., "Examination of Polysulfide Sealants by Scanning Electron Microscopy," Department of Defence, Defence Science and Technology Organisation Materials Research Laboratory, Melbourne, Victoria, Australia, May 3, 1988, pp. 1-20.

Zhang et al., "Sulfone-Containing Polymers as High Barrier Materials," J. of Polymer Sci.: Part B 32, 1671-1676 (1994.

Pendelton et al., "Low VOC Barrier Coating for Industrial Maintenance," Naval Facilities Engineering Command Port Hueneme, CA, Nov. 2007.

Machine English translation of Russia Patent No. 2326913.

Zakharchenko, I.P. et al., Editors, "Rubber Industry Worker's Handbook (Spravochnik Resinschika)"; Chemistry; 1971; pp. 161-162; Moscow.

* cited by examiner

ELASTIC GAS BARRIER COATING COMPOSITIONS

CROSS REFERENCE TO RELATED APPLICATIONS

This application claims the benefit of U.S. Provisional Application No. 62/013,675, filed Jun. 18, 2014, which is hereby incorporated in its entirety by reference.

NOTICE OF GOVERNMENT SUPPORT

This invention was made with Government support under Contract No. DE-EE-0005359 awarded by the Department of Energy.

FIELD OF THE INVENTION

The present invention relates to elastic gas barrier coating compositions, elastic gas barrier coatings; and substrates coated with the elastic gas barrier coating compositions.

BACKGROUND OF THE INVENTION

Barrier coatings are commonly used in a variety of industries to prevent vapor, gas and/or chemical ingress and/or egress. For example, barrier coatings are often used to coat materials found in tires and in bladders used in sporting equipment including shoes and balls. As can be appreciated, these substrates must retain a degree of flexibility and/or elasticity. However, coatings used for increasing the barrier properties of these substrates can have a negative effect on the flexibility and/or elasticity of the substrate.

Considerable efforts have been expended to develop barrier coatings that do not negatively affect the flexibility and/or elasticity of a substrate. While improved barrier coatings have been developed, these coatings exhibit some drawbacks. For instance, to achieve low temperature elasticity, a material with a low glass transition temperature must be used. Materials with a low glass transition temperature are poor oxygen/nitrogen gas barriers. As such, current barrier coatings are unable to achieve low temperature elasticity and provide a good oxygen/nitrogen gas barrier. Improved barrier coatings that provide both low temperature elasticity and good oxygen/nitrogen gas barrier performance are, therefore, desired.

SUMMARY OF THE INVENTION

The present invention is directed to an elastic barrier coating composition that can include a barrier material dispersed in an aqueous media, a polysulfide, and a curing agent reactive with the polysulfide. When applied to a substrate and cured to form a coating, the barrier material forms a continuous phase and a polysulfide elastomer forms a discontinuous phase.

The present invention is also directed to an elastic gas barrier coating that can include a continuous phase comprising a barrier material and a discontinuous phase comprising a polysulfide elastomer. Substrates coated with the elastic barrier coating compositions described herein are also disclosed.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" barrier material, "an" elastomeric material, "a" polysulfide, "a" curing agent, and the like refer to one or more of any of these items. Also, as used herein, the term "polymer" is meant to refer to prepolymers, oligomers and both homopolymers and copolymers. The term "resin" is used interchangeably with "polymer."

As indicated above, the present invention is directed to an elastic gas barrier coating composition. The elastic gas barrier coating composition can include a barrier material, a polysulfide, and a curing agent reactive with the polysulfide. As used herein, the term "barrier material" refers to a material that imparts a vapor barrier, gas barrier, and/or chemical barrier to a substrate when used in a coating that is applied over the substrate. "Vapor barrier" refers to a barrier and/or low permeability to liquid and/or its vapor. "Gas barrier" refers to a barrier and/or low permeability to oxygen, nitrogen, carbon dioxide, and/or other gases. "Chemical barrier" refers to a barrier and/or low permeability to the migration of a molecule from one substrate to another, and/or from within one substrate to its surface. Any resistance to permeation of vapor, gas, and/or chemical(s) is sufficient to qualify a coating as a "barrier coating" according to the present invention.

The gas barrier properties of a substrate, and/or any coatings thereon, are typically described in terms of the oxygen permeability ("P(O$_2$)"). The "P(O$_2$)" number quantifies the amount of oxygen that can pass through a substrate and/or coating under a specific set of circumstances and is generally expressed in units of cc·mm/m$^2$·day·atm. This is a standard unit of permeation measured as cubic centimeters of oxygen permeating through one millimeter thickness of a sample, of an area of a square meter, over a 24 hour period, under a partial pressure differential of one atmosphere at a specific temperature and relative humidity (R.H.) conditions.

The barrier material can include a barrier material dispersed in an aqueous media. As used herein, an "aqueous media" refers to a carrier-fluid that comprises more than 50 weight % water, based on the total weight of the carrier-fluid. The carrier-fluid can comprise more than 60 weight % water, or more than 70 weight % water, or more than 80 weight % water, or more than 90 weight % water such as 100 weight % water, based on the total weight of the carrier-fluid. The carrier-fluid can also comprise less than 50 weight % organic solvent, such as less than 25 weight %, or less than 15 weight %, or less than 5 weight %, based on the total weight of the carrier-fluid. Non-limiting examples of organic solvents that can be used include glycols, glycol ether alcohols, alcohols, ketones, glycol diethers, and diesters. Other non-limiting examples of organic solvents include aromatic and aliphatic hydrocarbons.

The barrier material can comprise an organic material. As used herein, an "organic material" refers to carbon containing oligomers and polymers. Organic materials that can be used to form the barrier materials that are then dispersed in the aqueous media include, but are not limited to, aqueous polyurethane dispersions, aqueous polyvinylidene chloride copolymer dispersions, and combinations thereof. Other organic materials that can be used to form the barrier materials include, but are not limited to, aqueous polyamide dispersions, aqueous ethylene vinyl alcohol dispersions, and combinations thereof.

Non-limiting examples of suitable polyurethanes that can be used to form the barrier materials include the polyurethanes described in U.S. Pat. No. 8,716,402 at column 2, line 13 to column 4, line 33, which is incorporated by reference herein. For example, and as described in U.S. Pat. No. 8,716,402, suitable polyurethanes can include polyurethanes that comprise at least 30 weight % of meta-substituted aromatic material, based on the total solid weight of the polyurethane resin.

The barrier materials can also include inorganic materials. As used herein, an "inorganic material" refers to materials and substances that are not organic, i.e., do not include carbon-based materials. The inorganic material can comprise a platy inorganic filler. As used herein, a "platy inorganic filler" refers to an inorganic material in the platy form. The term "platy" refers to a structure in which one dimension is substantially smaller than the two other dimensions of the structure resulting in a flat type appearance. The platy inorganic fillers are generally in the form of stacked lamellae, sheets, platelets, or plates with a relatively pronounced anisometry. The inorganic materials, such as the platy inorganic fillers, can further improve the barrier performance of the resulting coating by reducing the permeability of liquids and gases.

Suitable platy inorganic fillers can include those having a high aspect ratio, for example. Suitable high aspect ratio platy inorganic fillers include, for example, vermiculite, mica, talc, wollastonite, chlorite, metal flakes, platy clays, and platy silicas. Such fillers typically have diameters of 1 to 20 microns, 2 to 5 microns, or 2 to 10 microns. The aspect ratio of the fillers can be at least 5:1, such as at least 10:1 or 20:1. For example, mica flakes may have an aspect ratio of 20:1, talc may have an aspect ratio of 10:1 to 20:1, and vermiculite may have an aspect ratio of from 200:1 to 10,000:1.

Further, the materials that form the barrier material can be substantially free, essentially free, or completely free of reactive functional groups. As used herein, a "reactive functional group" refers to an atom, group of atoms, functionality, or group having sufficient reactivity to form at least one covalent bond with another reactive group in a chemical reaction. Further, the term "substantially free" as used in this context means the barrier material contains less than 1000 parts per million (ppm), "essentially free" means less than 100 ppm, and "completely free" means less than 20 parts per billion (ppb) of reactive functional groups. As such, the barrier material can comprise aqueous dispersed polyurethanes, aqueous dispersed polyvinylidene chloride copolymers, and mixtures thereof that are completely free of reactive functional groups. The absence of reactive functional groups prevents the barrier material from reacting with other materials or substances.

Alternatively, the barrier materials can have a reactive functional group. For instance, the barrier materials can comprise reactive functional groups that are reactive with themselves or with another component, such as a crosslinker. Non-limiting examples of reactive functional groups include mercapto or thiol groups, hydroxyl groups, (meth) acrylate groups, carboxylic acid groups, amine groups, epoxide groups, carbamate groups, amide groups, urea groups, isocyanate groups (including blocked isocyanate groups), and combinations thereof.

The barrier materials will contribute barrier properties to the coatings formed by the elastic gas barrier coating compositions. However, increasing the amount of barrier materials can lower the elasticity of a coating. Accordingly, the amount of barrier materials used in the coating compositions can be determined based upon the needs of the user. For example, the barrier materials described herein can comprise at least 5 weight %, at least 10 weight %, or at least 15 weight %, based on the total solid weight of the coating composition. The barrier materials described herein can comprise up to 75 weight %, up to 50 weight %, up to 35 weight %, or up to 20 weight %, based on the total solid weight of the coating composition. The barrier materials can also comprise a range such as from 5 weight % to 75 weight %, from 5 weight % to 35 weight %, or from 10 weight % to 20 weight %, based on the total solid weight of the coating composition. The weight % is determined by standard gel permeation chromatography.

The elastic gas barrier coating compositions can also include a polysulfide that can act as an elastomeric material in the final coating. As used herein, "elastomeric material" and like terms refer to materials that impart elasticity and/or flexibility. "Elasticity" and like terms refer to the ability of a material or substrate to return to its approximate original shape or volume after a distorting force has been removed. "Flexibility" and like terms refer to the ability of a material or substrate to return to its approximate original shape or volume after a mechanical force has been removed. Materials and substrates may be both flexible and elastomeric, or may be one or the other.

As indicated, the elastomeric material of the present invention comprises a polysulfide. "Polysulfide" refers to a polymer that contains one or more disulfide linkages, i.e., —[S—S]— linkages, in the polymer backbone, and/or in the terminal or pendant positions on the polymer chain. The polysulfide polymer can have two or more sulfur-sulfur linkages. The polysulfide can also include a mixture of primary disulfides and higher rank polysulfides such as tri and tetra polysulfide linkages (S—S—S; S—S—S—S). Further, the polysulfide can comprise mercapto or thiol functional groups (an —SH group). For instance, the polysulfide can be represented by chemical formula (I):

With respect to chemical formula (I), each R can independently be —(CH$_2$—CH$_2$—O—CH$_2$—O—CH$_2$—CH$_2$)— and a+b+c+d can be a number up to and including 1,000.

The polysulfide that can be used with the present invention can also be represented by chemical formula (II):

where n can be a number up to and including 1,000.

The polysulfide used as the elastomeric material can have a glass transition temperature (T$_g$) of less than 0° C., as measured by differential scanning calorimetry. The polysulfide used as the elastomeric material can also have a glass transition temperature (T$_g$) of less than −10° C., or less than −20° C., or less than −30° C.

Non-limiting suitable polysulfides are also commercially available under the trade name THIOPLAST®, a liquid polysulfide polymer with mercapto end groups supplied by Akzo Nobel, Greiz, Germany.

Other suitable polysulfides can include polysulfides described in "Sealants" by Adolfas Damusis, Reinhold Publishing Corp., 1967, at pages 175-195, which is incorporated by reference herein.

The coating composition also may be substantially free, may be essentially free, or may be completely free of all other elastomeric materials, except for polysulfides. The term "substantially free" as used in this context means the coating compositions contain less than 1000 parts per million (ppm), "essentially free" means less than 100 ppm, and "completely free" means less than 20 parts per billion (ppb) of all other elastomeric materials, except for polysulfides.

Alternatively, the elastomeric gas barrier coatings of the present invention can comprise a polysulfide and an additional elastomeric material. Non-limiting examples of additional elastomeric materials that can be used include acrylonitriles, natural and synthetic rubbers such as aqueous butyl rubber dispersions, styrenic thermoplastic elastomers, polyamide elastomers, thermoplastic vulcanizates, flexible acrylic polymers, and combinations thereof. Other non-limiting examples of suitable additional elastomeric materials are described in U.S. Pat. No. 8,716,402 at column 4, line 34 to column 5, line 2, which is incorporated by reference herein.

The elastomeric materials will contribute flexibility and/or elasticity to the coatings formed by the present coating compositions. Accordingly, the amount of elastomeric materials used in the coating compositions can be determined based upon the needs of the user. For example, the elastomeric materials described herein can comprise at least 5 weight %, at least 10 weight %, at least 15 weight %, at least 25 weight %, or at least 50 weight %, based on the total solid weight of the coating composition. The elastic materials described herein can comprise up to 80 weight %, up to 75 weight %, or up to 70 weight %, based on the total solid weight of the coating composition. The elastic materials can also comprise a range such as from 5 weight % to 80 weight %, from 25 weight % to 75 weight %, or from 50 to 70 weight %, based on the total solid weight of the coating composition. The weight % is determined by standard gel permeation chromatography.

As indicated, the coating compositions can also include a curing agent that is reactive with at least the polysulfide. As used herein, the term "curing agent" refers to a material that at least helps form higher molecular weight polysulfide elastomers. For example, the curing agent used with the coating compositions described herein can react with mercapto functionalities associated with a polysulfide to form a higher molecular weight polysulfide elastomer. Curing may occur during drying, as the coating may be cured at ambient temperatures, or it may occur upon application of an external stimulus: including, but not limited to, heat. A non-limiting example of a suitable curing agent includes manganese dioxide. Other non-limiting examples of suitable curing agents include peroxides and other materials known to those skilled in the art to at least oxidize mercapto functionalities to disulfides.

The coating compositions can also include a crosslinker. As used herein, a "crosslinker" refers to a molecule comprising two or more functional groups that are reactive with other functional groups and which is capable of linking two or more monomers or polymer molecules through chemical bonds. The crosslinker used with the compositions described herein can react with either the polysulfide, optional additional elastomeric materials, and/or one or more of the barrier materials. Non-limiting examples of crosslinkers that can be used with the compositions described herein include carbodiimides, aziridines, and combinations thereof. The carbodiimide can be represented by R—N=C=N—R' where R and R' can be aliphatic or aromatic groups.

The coating compositions of the present invention can also include other optional materials. For example, the coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes, and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of materials that can be used with the coating compositions of the present invention include plasticizers, abrasion resistant particles, corrosion resistant particles, corrosion inhibiting additives, anti-oxidants, hindered amine light stabilizers, UV light absorbers and stabilizers, surfactants, flow and surface control agents, thixotropic agents, organic cosolvents, reactive diluents, catalysts, reaction inhibitors, and other customary auxiliaries.

The aqueous dispersed barrier materials, polysulfide, curing agent, and, optionally, other materials described herein can be mixed together to form a macroscopically uniform mixture. The method of mixing these components is not limited and can include those methods known in the art of coatings. As used herein, a "macroscopically uniform mixture" refers to an even and consistent blend of components that exist at the macroscopic level. As such, after being mixed together, the coating compositions described herein can be applied as a macroscopic uniform mixture to a substrate and cured to form a coating.

The coating compositions can be applied to a variety of substrates. For example, the coating compositions can be applied to athletic balls, such as soccer balls, basketballs, volleyballs, footballs, racquet balls, squash balls, beach balls, tennis balls, golf balls, baseballs, and the like; inflatable rafts, furniture, toys, and the like; air mattresses, air bags, air shocks, bladders, emergency slides, life vests, medical equipment and devices, such as blood pressure bags, catheters, and the like; tires, such as bike tires, automobile tires, bike tubes, ultra-terrain bike tires, motorcycle tires, lawn tractor tires, and the like; balloons, air bladders, or other footwear applications, packaging material, such as bottles, wraps, food, or plastic sheets, hoses, garbage bags, plastic light bulbs, fire extinguishers, LED displays, plasma TV's, parachutes, scuba tanks, gas cylinders, flexible foam, rigid foam, other pipes, hoses, tubes, and the like; architectural needs, such as windows, roofing, siding, and the like; fiber optic cables, seals and gaskets, batteries, clothing and other textiles, swimming pool liners and covers, hot tubs, tanks, electronics, buckets, and pails.

Typically, the substrates will be those that have gas permeability, such as substrates comprising polymers, including but not limited to, polyesters, polyolefins, polyamides, cellulosics, polystyrenes, polyacrylics, and polycarbonates. Poly(ethylene terephthalate), poly(ethylene naphthalate), and combinations thereof may be particularly suitable. Other typical substrates will be those that exhibit flexibility and/or elasticity. As noted above, it will be appreciated that a flexible substrate may or may not also be an elastic substrate. Examples of flexible substrates include non-rigid substrates, such as thermoplastic urethane, synthetic leather, natural leather, finished natural leather, finished synthetic leather, ethylene vinyl acetate foam, polyolefins and polyolefin blends, polyvinyl acetate and copolymers, polyvinyl chloride and copolymers, urethane elastomers, synthetic textiles, and natural textiles. Elastic substrates include, for example, rubbers. The term "rubber" includes natural or synthetic elastomeric rubber materials, including but not limited to, acrylic rubber and nitrile rubber.

The coated substrate can have an elongation at break of 200% or greater at a temperature of 20° C. "Elongation at break" and like terms refer to the amount of elongation a coating can withstand prior to breaking or cracking. Elongation at break can be determined with an Instron 4443 with a temperature controlled test chamber (Instron made by Ensinger Inc., Washington Pa.).

The coatings formed from the coating compositions of the present invention can be applied by any means standard in the art, such as electrocoating, spraying, electrostatic spraying, dipping, rolling, brushing, and the like. The coatings of the present invention can be applied to a dry film thickness of 0.1 mil to 50 mils, or from 1 mil to 30 mils, or from 2 mils to 20 mils. The dry film thickness will be adjusted according to the coating application and preference of the user.

Further, the elastic gas barrier coating compositions can be applied to a substrate and cured to form elastic gas barrier coatings having a continuous phase comprising the barrier material and a discontinuous phase comprising a polysulfide elastomer, as determined by transmission electron microscopy (TEM) and field emission scanning electron microscopy (FESEM). As used herein, a "continuous phase" refers to a first phase surrounding a second discontinuous or dispersed phase. A "discontinuous phase" refers to the suspended particles or liquid droplets dispersed in the continuous phase. Thus, when the elastic gas barrier coating compositions are applied to a substrate and cured to form coatings, a polysulfide elastomer can be formed and dispersed as suspended particles in the continuous phase comprising the barrier materials.

Figure 1:
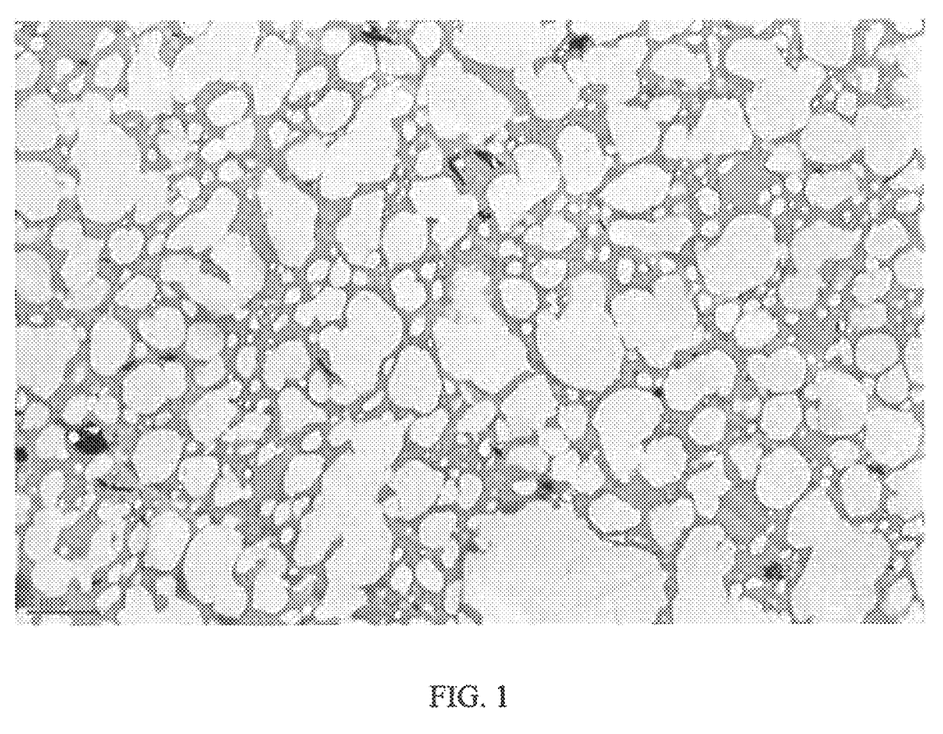
FIG. 1 is a transmission electron microscopy (TEM) micrograph of an elastic gas barrier coating according to the present invention.

Referring to the figures, FIG. 1 is a transmission electron microscopy (TEM) micrograph of an elastic gas barrier coating that is described in Examples 1 and 2 below. As shown in FIG. 1, the polysulfide elastomer is dispersed as solid particles (the white areas of the TEM image) in the continuous phase comprising the barrier material (the dark grey areas of the TEM image). The TEM image also shows the presence of residues of the curing agent (the black small particles in the TEM image).

Figure 2:
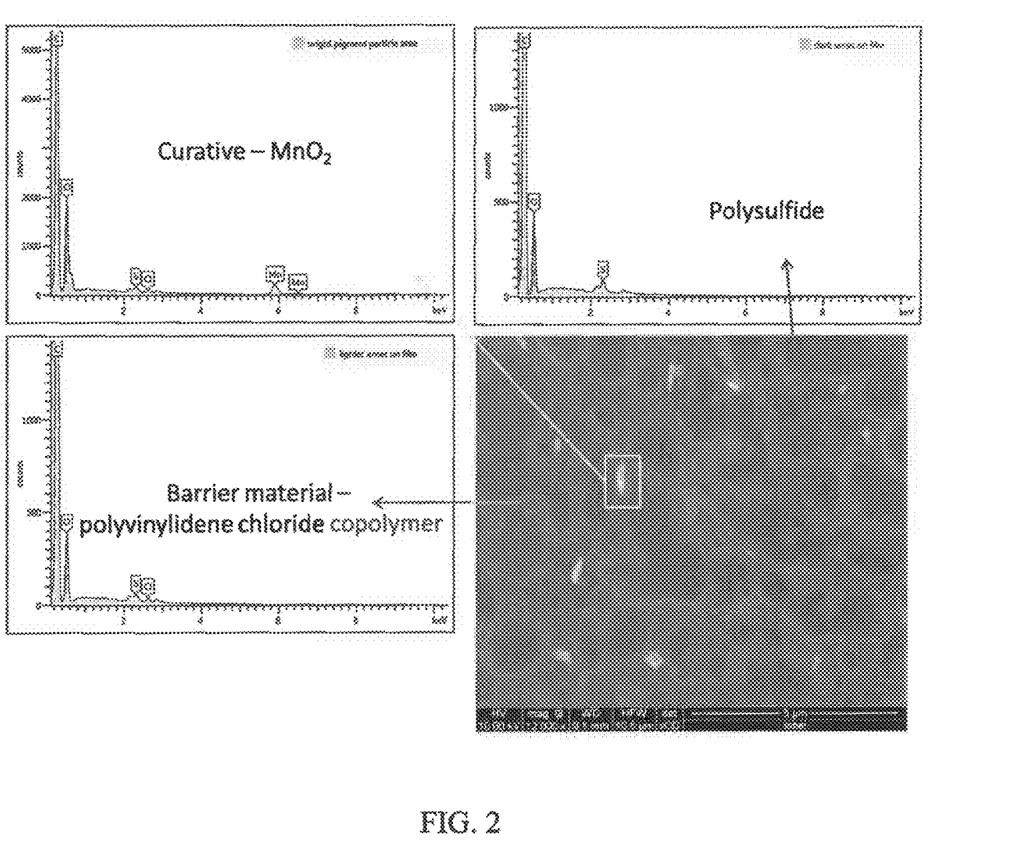
FIG. 2 is a field emission scanning electron microscopy (FESEM) image of the elastic gas barrier coating of FIG. 1.

FIG. 2 is a field emission scanning electron microscopy (FESEM) image/analysis of the same coating evaluated in FIG. 1. As shown and identified in FIG. 2, the polysulfide elastomer is dispersed as solid particles (dark areas of the FESEM image) in the continuous phase comprising the barrier materials (lighter continuous areas of the FESEM image). The FESEM image also shows the presence of residues of the curing agent (the white small particles in the FESEM image).

It was found that elastic gas barrier coating compositions can be applied to a substrate and cured to form elastic gas barrier coatings that provide both low temperature elasticity and good oxygen/nitrogen gas barrier performance. For example, coatings deposited from the elastic gas barrier coating compositions described herein have been found to exhibit an elasticity of at least 25% at temperatures as low as −40° C. The coatings also exhibit an elasticity of at least 100% at temperatures around room temperature (20° C. to 23° C.) and higher. Elasticity is evaluated by measuring of elongation at break, which is the ratio between changed length and initial length after breakage of the test specimen. The elongation data is determined by an Instron 4443 with a temperature controlled test chamber (Instron made by Ensinger Inc., Washington, Pa.). In addition, the elastic gas barrier coatings also exhibit good oxygen permeance at temperatures from −40° C. to 100° C. For example, the elastic gas barrier coatings can exhibit an oxygen permeance of 51 cc·mm/m$^2$·day·atm at 23° C., as determined by using oxygen transmission rate data obtained with a Mocon model 1/50, (Mocon Inc., Minneapolis, Minn.) in accordance with ASTM method F1927-14 which measures $O_2$ transmission rates at 23° C. at 50% relative humidity. Thus, the elastic gas barrier coatings of the present invention can exhibit an elasticity of at least 25% at −40° C. and an oxygen permeance of 51 cc·mm/m$^2$·day·atm at 23° C.

The following examples are presented to demonstrate the general principles of the invention. The invention should not be considered as limited to the specific examples presented. All parts and percentages in the examples are by weight unless otherwise indicated.

Example 1

Preparation of an Elastic Gas Barrier Coating Composition

An elastic gas barrier coating composition according to the present invention was prepared as follows.

To an appropriate sized container, 3.65 grams of manganese dioxide was slowly added and stirred with 35.0 grams of THIOPLAST® G12 (liquid polysulfide polymer with mercapto end groups, average molecular weight 4100-4600 g/mol, commercially available from Akzo Nobel, Greiz, Germany). In a separate container, 3.5 grams of water were slowly added to 3.5 grams of stirred BYK®-425 (liquid rheology agent, a polypropylene glycol solution of a urea modified polyurethane, commercially available from Altana, Wallingford, Conn.). Once the water addition was complete, stirring was maintained and 14.27 grams of polyurethane dispersion was slowly added. The added polyurethane dispersion was prepared according to Examples 1 and 2 of U.S. Pat. No. 8,716,402 at column 9, line 55 to column 10, line 59, which is incorporated by reference herein.

Then, 8.99 grams of DARAN® 8550 (polyvinylidene chloride copolymer latex dispersion, commercially available from Owensboro Specialty Polymer Inc., Owensboro, Ky.), having been neutralized to pH 7 with 50% dimethylethanolamine (DMEA) in water, was added dropwise to the stirred mixture. When the addition of the DARAN® 8550 was complete, stirring was continued and 50.0 grams of deionized water was added. The mixture was then added to the THIOPLAST® G12 and manganese dioxide mixture under agitation to form a macroscopically uniform mixture.

Example 2

Elastic Gas Barrier Coating

The coating formulation of Example 1 was applied to a polypropylene substrate using a drawdown bar, allowed to stand at room temperature for one day and then placed in a 140° F. oven for one day. The permeability and elongation to break of the cured coating were evaluated, the results of which are shown in Table 1. The compositional components are reported as weight % of contained solids.

TABLE 1

| Composition | $O_2$ Permeance [5] (cc · mm/m$^2$ · day · atm) | Elongation −40° C. [6] | Elongation 23° C. [6] |
|---|---|---|---|
| 67.6% THIOPLAST ® G12 [1] 7.1% MnO$_2$ 6.8% BYK ®-425 [2] 10% Polyurethane Dispersion [3] 8.6% DARAN ® 8550 [4] | 51.3 | 26% | 416% |

[1] Liquid polysulfide polymer with mercapto end groups, average molecular weight 4100-4600 g/mol, commercially available from Akzo Nobel, Greiz, Germany.
[2] Liquid rheology agent, a polypropylene glycol solution of a urea modified polyurethane, commercially available from Altana, Wallingford, CT.
[3] Prepared according to Examples 1 and 2 of U.S. Pat. No. 8,716,402 at column 9, line 55 to column 10, line 59.
[4] Polyvinylidene chloride copolymer latex dispersion, commercially available from Owensboro Specialty Polymer Inc., Owensboro, KY. Neutralized to pH 7 with 50% solution of dimethylethanolamine (DMEA) in water.
[5] Determined using oxygen transmission rate data obtained with a Mocon model 1/50, (Mocon Inc. Minneapolis MN), using ASTM method F1927-14, which measures $O_2$ transmission rates at 23° C. at 50% relative humidity.
[6] Elongation at break (used to evaluate elasticity) of the free film, which is the ratio between changed length and initial length after breakage of the test specimen. The elongation data was measured with an Instron 4443 having a temperature controlled test chamber (Instron made by Ensinger Inc., Washington PA). The test rate was 5 mm/minute, sample widths were 13 mm and the sample thicknesses were about 0.1 mm thick.

As shown in Table 1, the elastic gas barrier coating composition formed from the composition of Example 1 had a good oxygen permeance at 23° C. and 50% relative humidity. As further shown in Table 1, coatings formed from the composition of Example 1 also exhibited good elasticity at −40° C. and excellent elasticity at 23° C.

The coating of Example 2 was also evaluated with a transmission electron microscopy (TEM) micrograph, which is shown in FIG. 1, and field emission scanning electron microscopy (FESEM), which is shown FIG. 2.

As shown in FIG. 1, the polysulfide elastomer is dispersed as solid particles (the white areas of the TEM image) in the continuous phase comprising the barrier materials (the dark grey areas of the TEM image). The TEM image also shows the presence of residues of the curing agent (the black small particles in the TEM image).

As shown and identified in FIG. 2, the polysulfide elastomer is dispersed as solid particles (dark areas of the FESEM image) in the continuous phase comprising the barrier materials (lighter continuous areas of the FESEM image). The FESEM image also shows the presence of residues of the curing agent (the white small particles in the FESEM image).

Examples 3-12

Evaluation of Additional Elastic Gas Barrier Coatings

Examples 3-10 illustrate different elastic gas barrier compositions and coatings deposited from such compositions. The compositions were prepared with their respective components according to the procedures described in Example 1. Each composition was applied to a polypropylene substrate using a drawdown bar, allowed to stand at room temperature for one day and then placed in a 140° F. oven for one day, unless otherwise indicated. The oxygen permeability and elongation to break of the cured coatings were evaluated, the results of which are shown in Table 2. The compositional components are reported as weight % of contained solids.

TABLE 2

| Example | Composition | O₂ Permeance [5] | Elongation [6] -40° C. | Elongation [6] -20° C. |
|---|---|---|---|---|
| 3 (Control) | 88.5% THIOPLAST ® G12 [1]<br>4.5% MnO₂<br>7% BYK ®-425 [2] | 169.6 | 394% | N/A |
| 4 | 68% THIOPLAST ® G12 [1]<br>5% MnO₂<br>22% Polyurethane Dispersion [3]<br>5% BYK ®-425 [2] | 32.2 | 5.8% | 503% at 23° C. |
| 5 | 73.9% THIOPLAST ® G12 [1]<br>4.0% MnO₂<br>7.2% BYK ®-425 [2]<br>14.9% DARAN ® SL112 [7] | 51.8 | 185% | N/A |
| 6 | 68% THIOPLAST ® G12 [1]<br>7.0% MnO₂<br>5.0% BYK ®-425 [2]<br>8.6% Polyurethane Dispersion [3]<br>7.4% DARAN ® SL112 [7]<br>4% AQUALAST ® BL100 [8] | 54.4 | 85% | N/A |
| 7 | 58.4% THIOPLAST ® G12 [1]<br>4.6% MnO₂<br>7% BYK ®-425 [2]<br>24% Polyurethane Dispersion [3]<br>6% AQUALAST ® BL100 [8]<br>No Bake | 48.1 | 27% | 76% |
| 8 | 58.2% THIOPLAST ® G12 [1]<br>4.6% MnO₂<br>7.2% BYK ®-425 [2]<br>16.1% Polyurethane Dispersion [3]<br>13.8% AQUALAST ® BL100 [8] | 52.3 | 5.7% | N/A |
| 9 | 73.4% THIOPLAST ® G12 [1]<br>4.6% MnO₂<br>7.0% SOLSPERSE ® 2700 [9]<br>8.1% Polyurethane Dispersion [3]<br>7.9% DARAN ® SL112 [7] | 65.6 | 11% | 34% |
| 10 | 61.9% THIOPLAST ® G12 [1]<br>6.4% MnO₂<br>6.4% BYK ®-425 [2]<br>9.2% Polyurethane Dispersion [3]<br>7.8% DARAN ® 8550 [4]<br>8.3% MICROLITE ® 963 [10] | 1.98 | N/A | |
| 11 | 63.5% THIOPLAST ® G12 [1]<br>6.7% MnO₂<br>6.8% BYK ®-425 [2]<br>9.2% Polyurethane Dispersion [3]<br>7.8% DARAN ® 8550 [4] | 100.6 | 38.4% | |
| 12 | 63.5% THIOPLAST ® G12 [1]<br>6.7% MnO₂<br>6.8% BYK ®-425 [2]<br>9.2% Polyurethane Dispersion [3]<br>7.8% DARAN ® 8550 [4]<br>5.0% CARBODILITE ® V-02-L2 [11] | 85.7 | 22.8% | |

[7] Polyvinylidene chloride copolymer latex dispersion, commercially available from Owensboro Specialty Polymer Inc., Owensboro, KY. Neutralized to pH 7-9 with a solution of ammonium hydroxide.
[8] Anionic emulsion of butyl rubber, commercially available from Lord Corp., Cary, NC.
[9] Polymeric dispersant, commercially available from Lubrizol Corp., Wickliffe, Ohio.
[10] Vermiculite dispersion, commercially available from W. R. Grace & Co., Cambridge, MA.
[11] Carbodiimide crosslinker, commercially available from Nisshinbo Chemical Inc., Tokyo, Japan.

As shown in Table 2, Example 3 represents a control in which the composition used to prepare the coating contained no barrier materials. As a result, the oxygen permeance was very poor, while the elasticity was excellent.

Example 4 represents a coating formed from a composition that contains a barrier material comprising an aqueous polyurethane dispersion without polyvinylidene chloride copolymer latex dispersion. Example 5 represents a coating formed from a composition that contains a barrier material comprising polyvinylidene chloride copolymer latex dispersion without an aqueous polyurethane dispersion.

Examples 6-8 illustrate coatings formed from compositions that contain an additional elastomer, an aqueous butyl rubber dispersion, which is used along with the polysulfide.

Thus, in view of Examples 6-8, elastic gas barrier coatings can be formed with an additional elastomeric material that is used with the polysulfide.

To illustrate the use of different additives, Example 9 shows a coating formed from a composition with a polymeric dispersant. Example 10 illustrates a coating that includes a platy inorganic filler. As shown in Table 2, the platy inorganic filler improved barrier performance.

Examples 11 and 12 illustrate the effects of using a crosslinker. Example 11 includes the same components as Example 12, except for a crosslinker. Example 12 illustrates the use of a carbodiimide crosslinker. As shown in Table 2, the coating of Example 12, which includes a crosslinker, exhibited better barrier properties than the coating of Example 11, which does not include a crosslinker.

Example 13

Effect of Increasing Barrier Materials

Example 13 illustrates the effect on oxygen permeance and low temperature elasticity of elastic gas barrier coatings having increasing amounts of barrier materials. The compositions of Samples A-G were prepared with their respective components according to the procedures described in Example 1. Each composition was applied to a polypropylene substrate using a drawdown bar, allowed to stand at room temperature for one day and then placed in a 140° F. oven for one day, unless otherwise indicated. The oxygen permeability and elongation to break of the cured coatings were evaluated, the results of which are shown in Table 3. The compositional components are reported as weight % of contained solids.

TABLE 3

| Sample | Composition | O₂ Permeance [5] | Elongation [6] -40° C. | Elongation [6] 0° C. |
|---|---|---|---|---|
| A | 80.3% THIOPLAST ® G12 [1]<br>7.2% MnO₂<br>6.0% BYK ®-425 [2]<br>3.5% Polyurethane Dispersion [3]<br>2.9% DARAN ® SL112 [7] | 182 | 379% | 466% |
| B | 79.0% THIOPLAST ® G12 [1]<br>7.5% MnO₂<br>3.5% BYK ®-425 [2]<br>5.4% Polyurethane Dispersion [3]<br>4.6% DARAN ® SL112 | 99.3 | 396% | N/A |
| C | 73.4% THIOPLAST ® G12 [1]<br>4.6% MnO₂<br>7.0% BYK ®-425 [2]<br>8.1% Polyurethane Dispersion [3]<br>6.9% DARAN ® SL112 [7] | 91.9 | 71% | N/A |
| D | 68.5% THIOPLAST ® G12 [1]<br>4.0% MnO₂<br>6.9% BYK ®-425 [2]<br>11.1% Polyurethane Dispersion [3]<br>9.5% DARAN ® SL112 [7] | 78.3 | 35% | 318% |
| E | 63.9% THIOPLAST ® G12 [1]<br>3.5% MnO₂<br>6.9% BYK ®-425 [2]<br>13.9% Polyurethane Dispersion [3]<br>11.8% DARAN ® SL112 [7] | 45.7 | 2.7% | 60% |
| F | 58.4% THIOPLAST ® G12 [1]<br>4.6% MnO₂<br>7.0% BYK ®-425 [2]<br>16.2% Polyurethane Dispersion [3]<br>13.8% DARAN ® SL112 [7] | 34.3 | 3.2% | 230% |
| G | 35.5% THIOPLAST ® G12 [1]<br>7.5% MnO₂<br>7.0% BYK ®-425 [2] | 8.5 | 8.1% | N/A |

TABLE 3-continued

| Sample | Composition | O₂ Permeance [5] | Elongation [6] −40° C. | 0° C. |
|---|---|---|---|---|
| 5 | 27% Polyurethane Dispersion [3] 23% DARAN ® SL112 [7] | | | |

As shown in Table 3, increasing the amount of barrier materials in the elastic gas barrier coating compositions according to the present invention improves barrier performance but diminishes elasticity at low temperatures.

The present invention is also directed to the following clauses.

Clause 1: An elastic barrier coating composition comprising: a barrier material dispersed in an aqueous media; a polysulfide; and a curing agent reactive with the polysulfide, wherein when applied to a substrate and cured to form a coating, the barrier material forms a continuous phase and a polysulfide elastomer is formed as a discontinuous phase.

Clause 2: The elastic barrier coating composition of clause 1, wherein the polysulfide comprises mercapto functional groups.

Clause 3: The elastic barrier coating composition of any of clauses 1-2, wherein the barrier material comprises an aqueous polyurethane dispersion, an aqueous polyvinylidene chloride copolymer dispersion, or a combination thereof.

Clause 4: The elastic barrier coating composition of any of clauses 1-3, wherein the barrier material further comprises an inorganic material.

Clause 5: The elastic barrier coating composition of clause 4, wherein the inorganic material comprises a platy inorganic filler.

Clause 6: The elastic barrier coating composition of any of clauses 1-5, wherein the polysulfide has a glass transition temperature of less than 0° C.

Clause 7: The elastic barrier coating composition of any of clauses 1-6, wherein the polysulfide is represented by chemical formula (I):

where R is —(CH₂—CH₂—O—CH₂—O—CH₂—CH₂)— and a+b+c+d is a number up to and including 1,000.

Clause 8: The elastic barrier coating composition of any of clauses 1-7, wherein the curing agent comprises manganese dioxide.

Clause 9: The elastic barrier coating composition of any of clauses 1-8, wherein the coating composition forms a macroscopically uniform mixture.

Clause 10: The elastic barrier coating composition of any of clauses 1-9, further comprising a crosslinker reactive with the polysulfide and/or the barrier material.

Clause 11: The elastic barrier coating composition of clause 10, wherein the crosslinker comprises a carbodiimide, an aziridine, or a combination thereof.

Clause 12: The elastic barrier coating composition of any of clauses 1-11, wherein when applied to a substrate and cured to form a coating, the coating has an elasticity of at least 25% at −40° C. as determined by measuring elongation at break, and a permeance of 51 cc·mm/m²·day·atm at 23° C. as determined in accordance with ASTM method F1927-14.

Clause 13: A substrate at least partially coated with the coating composition of any of clauses 1-12.

Clause 14: The substrate of clause 13, wherein the coated substrate has an elongation at break of 200% or greater at a temperature of 20° C.

Clause 15: The substrate of any of clauses 13-14, wherein the substrate comprises an elastic substrate.

Clause 16: An elastic barrier coating comprising: a continuous phase comprising a barrier material; and a discontinuous phase comprising a polysulfide elastomer.

Clause 17: The elastic barrier coating of clause 16, wherein the coating has an elasticity of at least 25% at −40° C. as determined by measuring elongation at break, and a permeance of 51 cc·mm/m²·day·atm at 23° C. as determined in accordance with ASTM method F1927-14.

Clause 18: The elastic barrier coating of any of clauses 16-17, wherein the barrier material comprises an aqueous polyurethane dispersion, an aqueous polyvinylidene chloride copolymer dispersion, or a mixture thereof.

Clause 19: The elastic barrier coating of any of clauses 16-18, wherein the barrier material further comprises an inorganic material.

Clause 20: The elastic barrier coating of any of clauses 16-19, wherein at least one of the following is crosslinked with a crosslinker: the barrier material with itself, the polysulfide elastomer with itself, and the barrier material to the polysulfide.

Clause 21: The elastic barrier coating of clause 20, wherein the crosslinker comprises a carbodiimide, an aziridine, or a combination thereof.

Whereas particular embodiments of this invention have been described above for purposes of illustration, it will be evident to those skilled in the art that numerous variations of the details of the present invention may be made without departing from the invention as defined in the appended claims.

The invention claimed is:

1. An elastic barrier coating composition comprising:
   a barrier material dispersed in an aqueous media;
   a liquid polysulfide; and
   a curing agent reactive with the liquid polysulfide,
   wherein when applied to a substrate and cured to form a coating, the barrier material forms a continuous phase and a polysulfide elastomer is formed as a discontinuous phase,
   wherein the elastic barrier coating composition comprises an amount of the barrier material within a range of from 10 weight % to less than 25 weight %, based on the percentage of contained solids in the elastic barrier coating composition, and wherein the barrier material comprises an aqueous polyurethane dispersion, an aqueous polyvinylidene chloride copolymer dispersion, or a combination thereof.

2. The elastic barrier coating composition of claim 1, wherein the liquid polysulfide comprises mercapto functional groups.

3. The elastic barrier coating composition of claim 1, wherein the barrier material further comprises an inorganic material.

4. The elastic barrier coating composition of claim 3, wherein the inorganic material comprises a platy inorganic filler.

5. The elastic barrier coating composition of claim 1, wherein the liquid polysulfide has a glass transition temperature of less than 0° C.

6. The elastic barrier coating composition of claim 1, wherein the liquid polysulfide is represented by chemical formula (I):

where R is —$(CH_2—CH_2—O—CH_2—O—CH_2—CH_2)$— and a+b+c+d is a number up to and including 1,000.

7. The elastic barrier coating composition of claim 1, wherein the curing agent comprises manganese dioxide.

8. The elastic barrier coating composition of claim 1, wherein the coating composition forms a macroscopically uniform mixture.

9. The elastic barrier coating composition of claim 1, further comprising a crosslinker reactive with the liquid polysulfide and/or the barrier material.

10. The elastic barrier coating composition of claim 9, wherein the crosslinker comprises a carbodiimide, an aziridine, or a combination thereof.

11. The elastic barrier coating composition of claim 1, wherein when applied to a substrate and cured to form a coating, the coating has an elasticity of at least 25% at −40° C. as determined by measuring elongation at break, and a permeance of 51 cc·mm/m²·day·atm at 23° C. as determined in accordance with ASTM method F1927-14.

12. The elastic barrier coating composition of claim 1, wherein the elastic barrier coating composition comprises an amount of the barrier material within a range of from 10 weight % to 21 weight %, based on the percentage of contained solids in the elastic barrier coating composition.

13. A substrate at least partially coated with the coating composition of claim 1.

14. The substrate of claim 13, wherein the coated substrate has an elongation at break of 200% or greater at a temperature of 20° C.

15. The substrate of claim 13, wherein the substrate comprises an elastic substrate.

16. The substrate of claim 13, wherein the substrate is a tire.

17. An elastic barrier coating comprising:
a continuous phase comprising a barrier material; and
a discontinuous phase comprising a polysulfide elastomer,
wherein the elastic barrier coating is formed from an elastic barrier coating composition comprising an amount of the barrier material within a range of from 10 weight % to less than 25 weight %, based on the percentage of contained solids in the elastic barrier coating composition, and wherein the barrier material comprises an aqueous polyurethane dispersion, an aqueous polyvinylidene chloride copolymer dispersion, or a combination thereof.

18. The elastic barrier coating of claim 17, wherein the coating has an elasticity of at least 25% at −40° C. as determined by measuring elongation at break, and a permeance of 51 cc·mm/m²·day·atm at 23° C. as determined in accordance with ASTM method F1927-14.

19. The elastic barrier coating of claim 17, wherein the barrier material further comprises an inorganic material.

20. The elastic barrier coating of claim 17, wherein at least one of the following is crosslinked with a crosslinker: the barrier material with itself, the polysulfide elastomer with itself, and the barrier material to the polysulfide.

21. The elastic barrier coating of claim 20, wherein the crosslinker comprises a carbodiimide, an aziridine, or a combination thereof.

* * * * *